March 31, 1925.  1,531,274
F. G. COWDEN
TEAKETTLE
Filed Nov. 16, 1923
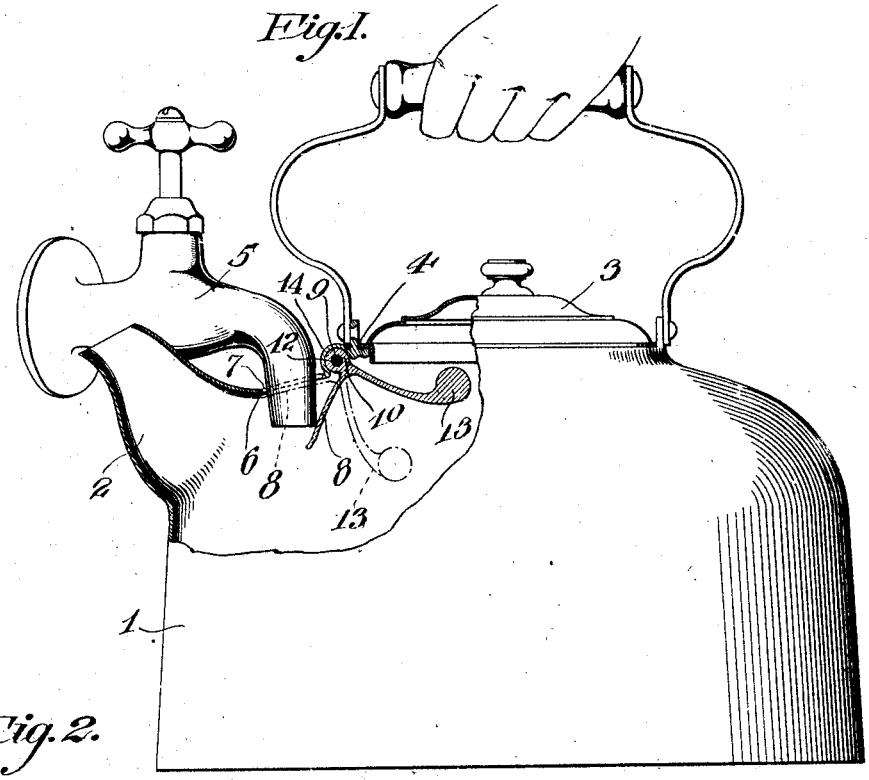
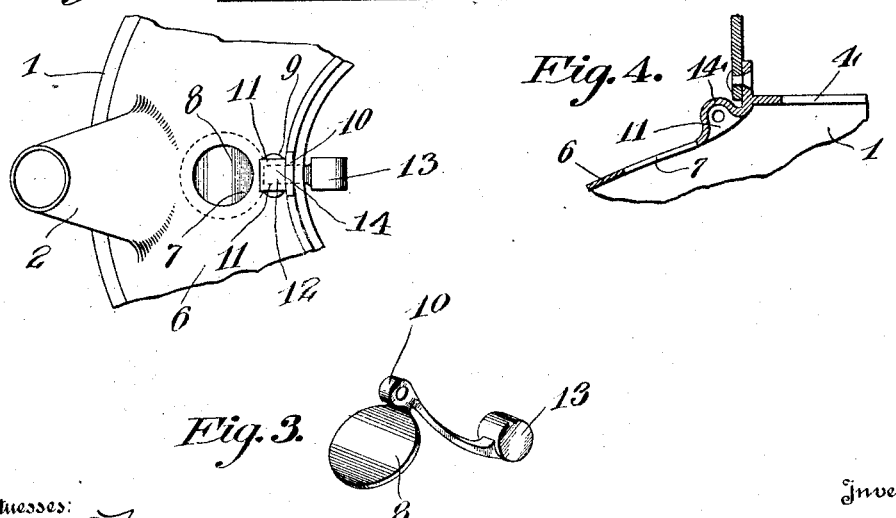
Witnesses:
Virgil L. Maris
George A. Gruss
Inventor
Frederick G. Cowden
By Joshua R. H. Otto
his Attorney Patented Mar. 31, 1925.

1,531,274

UNITED STATES PATENT OFFICE.

FREDERICK G. COWDEN, OF PHILADELPHIA, PENNSYLVANIA.

TEAKETTLE.

Application filed November 16, 1923. Serial No. 675,132.

*To all whom it may concern:*

Be it known that I, FREDERICK G. COWDEN, a citizen of the United States, residing at Philadelphia, in the county of Philadelphia and State of Pennsylvania, have invented certain new and useful Improvements in Teakettles, of which the following is a specification.

My invention relates to tea kettles and its object is to provide a kettle which may be placed under a spigot, filled with water and removed from under the spigot without tilting the kettle or spilling the water therefrom.

These objects, and other advantageous ends which will be described hereinafter, I attain in the following manner, reference being had to the accompanying drawings in which—

Figure 1 is a side view of a kettle partly in section illustrating how it may be placed under a spigot without tilting, Figure 2 a fragmentary plan view of the kettle shown in Figure 1, Figure 3 a perspective view of a flap forming part of my invention, and Figure 4 a fragmentary section similar to Figure 1 showing the pivotal attaching means without the flap.

Referring to the drawings, 1 indicates a tea kettle, 2 its spout, 3 its lid covering the entrance opening 4 and 5 an ordinary spigot. The top wall 6 of the kettle is provided with an aperture 7, located between the periphery of the kettle and its entrance opening, normally closed by a flap 8 hinged at 9 to swing within the kettle. The hinge connection consists of a lug 10, on the flap, fitting between a pair of ears 11 on the kettle and a pin 12 passing through the ears and lug. A weighted arm 13, integral with flap 8 and lug 10, is disposed substantially at right angles to the flap. This arm normally keeps the flap against the aperture and allows free swinging movement of the flap when pressed inward by the spigot as shown in Figure 1. Ears 11 are provided with an integral hood 14 for closing the opening formed between the ears to prevent water from splashing and leaking through onto the outside of the kettle.

To fill the kettle with water, aperture 7 is placed under the spigot 5 and the kettle raised slightly so that the bib of the spigot will project through the aperture and move flap 8 from the position shown in dot-and-dash lines in Figure 1 to the full line position. The spigot may then be turned on and the kettle filled with water. After the kettle is filled with water it is merely necessary to lower the kettle and allow the weighted arm 13 to swing flap 8 against the opening as shown in dot-and-dash lines in Figure 1. The kettle is then easily removed from under the spigot without tilting or spilling the water therein.

A kettle constructed as above set forth may be completely filled with water without spilling it; is convenient to fill from a spigot, and will not mar or scratch the spigot or sink when being filled.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:

A tea kettle having an aperture in the top part of its wall; ears integral with the outer side of the wall adjacent the aperture; an integral hood between the ears; a flap; a lug integral with the flap pivoted between the outwardly extending ears and under the hood to swing within the kettle and a weighted arm integral with the flap for keeping it against the aperture.

In testimony whereof I have signed my name to this specification in the presence of two subscribing witnesses.

FREDERICK G. COWDEN.

Witnesses:
ELIZABETH GARHE,
CHAS. E. POTTS.